(12) United States Patent
Cole et al.

(10) Patent No.: US 7,788,281 B2
(45) Date of Patent: Aug. 31, 2010

(54) EVALUATION OF SPATIAL RULES OVER A MOBILE POPULATION

(75) Inventors: Alan George Cole, Katonah, NY (US); Sastry S. Duri, Yorktown Heights, NY (US); Jonathan Paul Munson, Putnam Valley, NY (US); David Alvra Wood, III, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 1183 days.

(21) Appl. No.: 10/799,052

(22) Filed: Mar. 12, 2004

(65) Prior Publication Data

US 2005/0216583 A1 Sep. 29, 2005

(51) Int. Cl.
G06F 7/00 (2006.01)
(52) U.S. Cl. .................... 707/792; 707/922; 707/999.01
(58) Field of Classification Search .................. 707/1, 707/10, 100, 104.1, 200–201, 792, 922, 999.01; 455/456.1; 379/88.5, 142.1, 157; 705/64; 709/203, 206; 706/47
See application file for complete search history.

(56) References Cited

U.S. PATENT DOCUMENTS

| | | | | |
|---|---|---|---|---|
| 5,655,015 | A * | 8/1997 | Walsh et al. | 379/201.04 |
| 6,490,574 | B1 * | 12/2002 | Bennett et al. | 706/47 |
| 6,650,902 | B1 * | 11/2003 | Richton | 455/456.3 |
| 6,850,922 | B1 * | 2/2005 | Wason | 706/47 |
| 7,039,164 | B1 * | 5/2006 | Howe | 379/88.05 |
| 7,047,020 | B2 * | 5/2006 | Gerecht | 455/456.1 |
| 7,054,614 | B1 * | 5/2006 | Hunzinger | 455/411 |
| 7,062,469 | B2 * | 6/2006 | Meyers et al. | 705/64 |
| 2005/0014556 | A1 * | 1/2005 | Duhamel | 463/20 |
| 2005/0148342 | A1 * | 7/2005 | Sylvain | 455/456.3 |
| 2005/0159883 | A1 * | 7/2005 | Humphries et al. | 701/207 |

(Continued)

FOREIGN PATENT DOCUMENTS

DE 100 56 519 A1 11/2000

(Continued)

OTHER PUBLICATIONS

"Department of Defense Solutions," An ispheres White Paper.

(Continued)

*Primary Examiner*—Miranda Le
(74) *Attorney, Agent, or Firm*—Ryan, Mason & Lewis, LLP

(57) ABSTRACT

Spatial rules involve locations of entities, such as wireless devices, from a mobile population. When evaluating rules in a communication network, attributes of an entity are determined, where one of the attributes comprises location of the entity. Rules are evaluated to produce one or more results, each of the rules operating on the attributes of the entity. Specified actions for the rules are performed, based on the evaluation of the rules. At least one of the specified actions comprises communicating a result to an application. The communication network may have a portion that is wireless. An attribute of the entity can include subscriber information and an entity generally corresponds to a particular subscriber in the communication network, but the entity may also correspond to multiple subscribers. An entity may be a wireless device, which can subscribe to a network. Rules can apply to particular geographical regions, to particular subscribers, to both, or to additional criteria.

43 Claims, 7 Drawing Sheets

U.S. PATENT DOCUMENTS

2005/0164695 A1* 7/2005 Kamdar et al. ............... 455/420
2005/0204003 A1* 9/2005 Vargas et al. ................ 709/206
2006/0135174 A1* 6/2006 Kraufvelin et al. ....... 455/456.1
2006/0156209 A1* 7/2006 Matsuura et al. ............ 714/798
2007/0168397 A1* 7/2007 Satyanarayana ............ 707/200

FOREIGN PATENT DOCUMENTS

EP       1 041 831 A1    10/2000
EP       1 069 792 A1    1/2001
WO       WO 00 79811 A1  12/2000

OTHER PUBLICATIONS

"iSpheres Halo: Real-Time Event Server; Event Management and Alerting System for the Adaptive Enterprise,".
Technical White Paper, Event Server Architecture.

* cited by examiner

FIG. 4

```
spatial_rule  → rule_expr
rule_expr     → rule_expr OR rule_expr
              | rule_expr AND rule_expr
              | NOT rule_expr
              | rule_func
rule_func     → containedIn {polygon | polygonClass+}
              | withinDistanceOf entity distance
              | hasIdentity {subscriber | subscriberClass+}
              | scalar_func{< | <= | == | != | >= | >} scalar_func
              | timer period {subscriber | subscriberClass+}
polygon       → representation of a polygon
subscriber    → string literal
entity        → subscriber | subscriberClass+ | point | pointClass+
distance      → scalar_func
point         → representation of a point
scalar_func   → SPRField component
              | distanceFrom {subscriber | point}
              | distanceTraveledSince {point | time} {route | path}
              | constant numeric literal
              | reference resourceID
component     → X | Y | Z | SPEED | BEARING | TIME | ...
resourceID    → string literal
```

EVALUATION OF SPATIAL RULES OVER A MOBILE POPULATION

CROSS-REFERENCE TO RELATED APPLICATIONS

The present invention is related to U.S. patent application Ser. No. 10/315,651, by inventors S. Duri, V. Gupta, J. Munson, D. Wood, and A. Cole, filed on Dec. 10, 2002, and entitled "High-Rate Proximity Detection With the Ability to Provide Notification," the disclosure of which is hereby incorporated by reference.

FIELD OF THE INVENTION

The present invention relates to communication systems and, more particularly, relates to distributed processing using communication systems.

BACKGROUND OF THE INVENTION

There is an increasingly important class of applications known as "sense-and-respond applications." Such applications are referred to as sense-and-respond applications in that these applications respond to situations they sense. The applications span a wide range of domains, including commercial promotion, security, fleet management, and gaming. A particularly important subset of sense-and-respond applications involves the detection of situations that are partly defined by the positions of mobile entities. As technology for precise positioning of mobile entities becomes more affordable and widespread, these applications will become even more valuable.

A problem with current sense-and-respond systems is that a programmer typically has to create an application able to both sense a situation and respond to the sensed situation. This can be a time-consuming process and is limited in that if the underlying technology that provides the sensing operation changes, then the application must be rewritten. Further, any rule that is to be applied to a sensed situation in order to carry out the response is part of the application, and the application generally has to be changed if the rule is changed. Additionally, there are scalability issues, which arise when such applications are deployed to sense situations involving tens of millions of mobile entities and to respond to those situations.

Thus, there is a need to provide improved, scalable techniques for sensing situations involving mobile entities and for responding to the sensed situations.

SUMMARY OF THE INVENTION

The present invention provides techniques for evaluating spatial rules over a mobile population. The spatial rules involve locations of entities from the mobile population. Exemplary embodiments of the present invention can separate sense-and-respond applications into sense portions and respond portions. Illustratively, this separation can allow programmers to program the sense portion generally without regard to the respond portion or for programmers to program the respond portion without regard to the sense portion. The separation has other exemplary benefits described below.

In an aspect of the invention, when evaluating rules in a communication network, one or more attributes of an entity are determined, where one of the attributes comprises location of the entity. One or more rules are evaluated to produce one or more results, each of the rules operating on the one or more attributes of the entity. One or more specified actions for the rules are performed, based on the evaluation of the one or more rules. At least one of the specified actions comprises communicating the one or more results to an application. The communication network may have a portion that is wireless.

An entity may be a wireless device such as a cellular telephone, Personal Digital Assistant (PDA), or portable computer. An attribute of the entity may include subscriber information and an entity may generally correspond to a particular subscriber in the communication network, but the entity may also correspond to multiple subscribers. Rules may apply to particular geographical regions, to particular subscribers, to both, or to additional criteria.

The specified actions may involve communicating rule-triggered events to applications (e.g., outside the communication network although the applications may also reside in the communication network) that are the respond portion of the present invention. The applications can then perform their own processing on the rule-triggered events.

In another aspect of the invention, there are a number of nodes in the communication network, and each node is provided with a number of rules. Each node can reduce the rules examined by the node by, for example, determining if the entity corresponding to a rule is not within a coverage region defined for the node or, as another example, whether no portion of a particular geographical region to which a rule corresponds is within the coverage region defined for the node. In reduction situations, the reduced rules could, illustratively, be deleted or ignored.

In yet another aspect of the invention, persistent data relating to an entity in the communication network can be transferred from node to node as the entity moves from node to node. For example, persistent data relating to an entity could be the time the entity entered a geographical region that spans the coverage regions for multiple nodes. When the entity enters the coverage region for a first node, the time will be recorded as persistent data. When the entity transfers from the coverage region for the first node to the coverage region for the second node, the persistent data will be transferred from the first to the second node.

A more complete understanding of the present invention, as well as further features and advantages of the present invention, will be obtained by reference to the following detailed description and drawings.

BRIEF DESCRIPTION OF THE DRAWINGS

FIG. 4 is an example of possible rule grammar used for spatial rules;

DETAILED DESCRIPTION OF PREFERRED EMBODIMENTS

Figure 1:
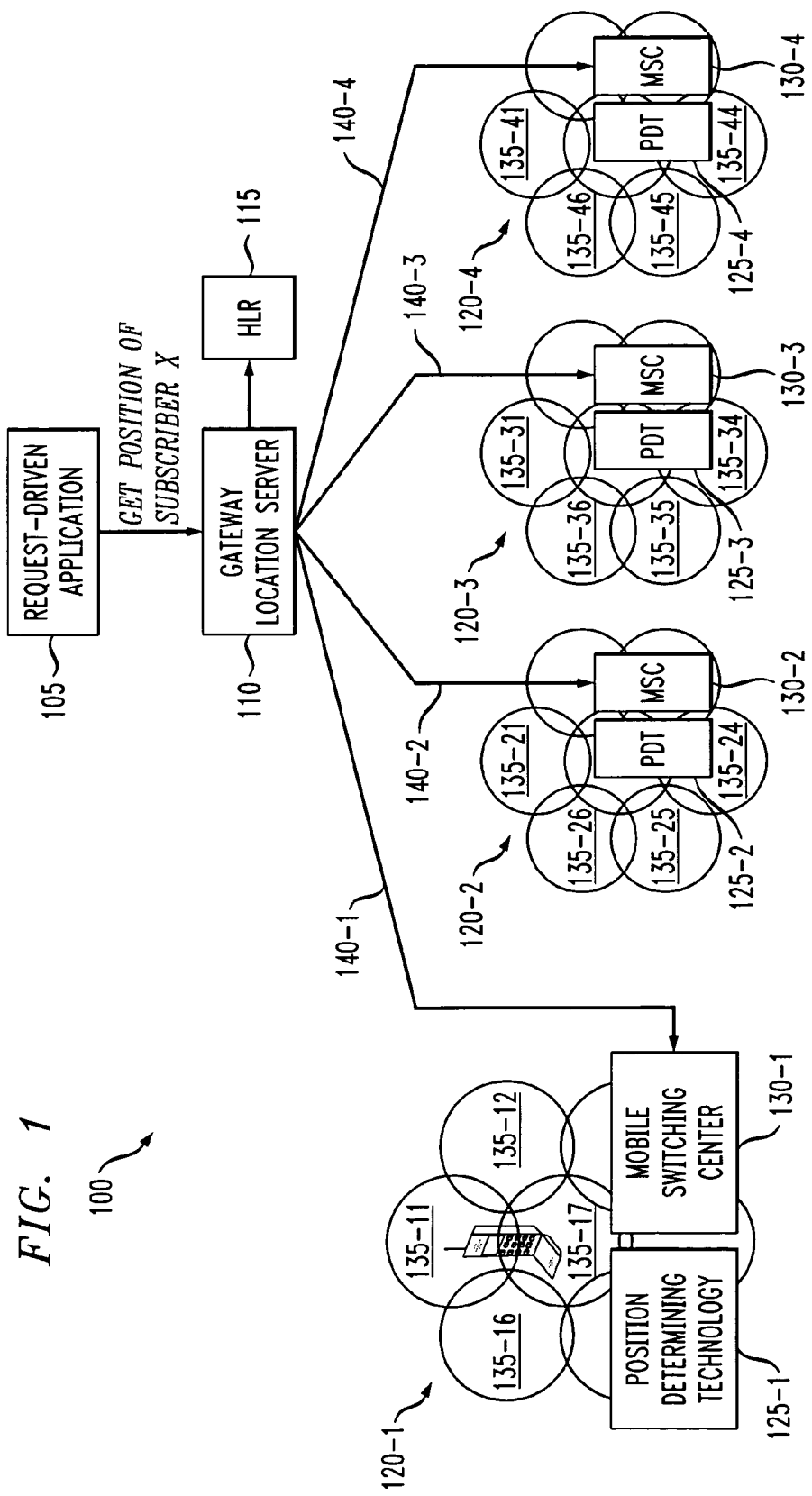
FIG. 1 shows an exemplary block diagram of a communications network, illustrating a possible configuration for evaluating spatial rules over a mobile population.

The present invention provides methods and apparatus allowing evaluation of spatial rules over a mobile population. Location of an entity, as part of a mobile population of entities, is used as one of a number of attributes of the entity when a spatial rule is evaluated. An entity is any device for which its location can be determined. The entity is mobile, although there may be periods when the entity is in one location. A spatial rule is evaluated to produce results and the spatial rule operates on the attributes of the entity. Actions, based on the results of the spatial rule, are performed as specified for the spatial rule. Such actions can include sending a message to an application, the application then performing a certain operation. For instance, an operation could be to send a command and message to the entity so that the entity can, as per the command, alert an operator through a sound or other alert action and display the message. Spatial rules will typically be referred to as "rules" herein for simplicity.

Exemplary embodiments of the present invention allow sense-and-respond applications to be separated into a sense portion and a respond portion. The present invention is primarily concerned with the sense portion in a network, and it is assumed that the respond portion is able to be in communication with the network but that programming or operation of the respond portion is to be defined by an enterprise.

Certain exemplary embodiments of the present invention allow many entities to be evaluated as part of a large mobile population. By way of illustration, a number of nodes can be provided with a set of rules for a number of entities able to be located in the communications network. A node is a device able to determine attributes of one or more entities and able to evaluate rules for the one or more entities. Further, a node is assigned to a portion of a network and will therefore evaluate rules for those entities associated with that portion of the network. Each node then evaluates the rules, using locations for entities within a coverage area of the node, and produces results for the rules. The results can be communicated to, for instance, applications. In the description that follows, an "application" is separate from the portion of the present invention that evaluates rules. Because the evaluation process and location determination of entities are spread over a number of nodes, there is a faster evaluation and less data traffic over the network than if a single node were used to perform the evaluation and location determination or requests thereof.

Additionally, each node can have a set of rules that apply to all the entities able to be located in the communications network. Each node can reduce the number of rules by examining each rule and determining if evaluation of a rule will produce constant results for a time period. If so, the node can, for example, eliminate the rule completely or mark the rule as unnecessary. In the latter instance, the rule might be examined at a later time.

Furthermore, each node can provide persistent data that can move with the entity as the entity moves from one node to another node. These and other examples are described in detail below.

For ease of reference, the present description is divided into the following sections: Introduction; Exemplary Programming Model; Exemplary System Components and Interfaces; Exemplary Rule Classes, and Exemplary Method and Computer System. Each of the sections is further divided into corresponding subsections. Furthermore, two Appendices are provided to illustrate Scalar Range Comparison for Relational Rule-Function Reduction and to illustrate a Sample Application.

1. Introduction

There is a large class of sense-and-respond applications that involve responding to the movements of large numbers of mobile subscribers. These classes, by way of example, include:

Location-based notification;
Telematics applications;
Real-world games;
Field-force dispatch and security; and
Emergency services.

These applications require continuous, precise position-tracking of the mobile subscribers. Supporting them requires a significant infrastructure, including location-determination technology, basic location-related services such as geocoding and reverse geocoding, and database technology that can efficiently support spatially related queries. If, however, this infrastructure can be leveraged by hundreds of applications, and millions of subscribers—including consumers, enterprises, and other service providers—the infrastructure can produce a broad array of revenue streams for its owner, and enable the location-based services using the infrastructure to be deployed at a lower cost.

The present invention provides an infrastructure, in an exemplary embodiment, that evaluates spatial rules over a mobile population and that provides the following benefits (e.g., among other benefits):

(1) The infrastructure can offer a high-level programming model that enables application developers to easily encode spatial relationships in their applications;

(2) The infrastructure is scalable to tens of millions of subscribers; and (3) The infrastructure is able to provide quality-of-service guarantees to the clients, whose usage of the infrastructure can be billable.

In the section below, several application scenarios are described using exemplary embodiments of the present invention. Following this section, performance requirements are described, and then an overview is given of aspects of the present invention.

1.1 Application Scenarios

Below are several scenarios that illustrate the range of applications that the present invention may be designed to serve.

1.1.1 Location-Based Notification

An often-discussed mobile commerce application is proximity-based coupon delivery. In a typical scenario, a merchant is notified when a valued customer is within some distance of a retail outlet, upon which the customer is delivered a coupon or some notice of a special promotion. This is an example of what is termed location-based notification, which may be defined, for instance, as the act of sending a text or multimedia message to wireless subscribers when they are determined to be in a particular geographical area. The most popular scenario involving location-based notification is delivering coupons, but location-based notification actually may be seen as a general-purpose communications mechanism, with a wide range of applications. For example, location-based notification can be used to:

Notify a consumer as they enter a shopping center that a back-to-school sale from office supply store is over in two hours.

Notify drivers who enter a certain section of highway that construction two miles ahead is causing a backup and they should take a detour.

Alert drivers that because of severe fog conditions ahead they should reduce speed immediately.

Send a message to all subscribers in a certain area that their water supply will be cut off in half an hour to replace a section of pipe.

Warn a game player that they are entering a "target zone" and are in danger of being abducted by targeted by another team.

Inform lottery players that they are close to the "pot of gold at the end of the rainbow" and that they should look for someone dressed as a leprechaun.

Thus there is a range of uses for location-based notification, from public safety and public service, to commercial promotion and tourism, to pure entertainment. A location-based notification service offers notification publishers the ability to define notification campaigns, which consist of one or more notification areas, each with a message or some media object to be delivered to the subscriber when they enter the notification area(s). Publishers would typically pay a fee for each notification delivered.

Embodiments of present invention can be configured to offer a scalable infrastructure on top of which the notification service can be implemented. Each campaign of a publisher results in simple spatial computations that an embodiment of the present invention can distribute throughout its infrastructure, enabling the service to be offered to thousands of publishers, serving potentially millions of subscribers.

1.1.2 Telematics Applications

Many telematics applications can benefit from the functionality offered by exemplary embodiments of the present invention. A fleet operator could define a geographic boundary and issue a request to be notified whenever vehicles enter or exit the geographic boundary. In telematics parlance, this concept it referred to as geofencing. This functionality could be used to automatically notify the fleet operator of the exact time a delivery truck enters or leaves a warehouse, or a customer premises. By periodically monitoring the progress of a delivery truck, an exemplary embodiment of the present invention could notify the fleet operator when the delivery truck fails to meet certain operational objective, for example, not being near a predetermined point along the delivery route. Some telematics applications require periodic sampling of vehicle location but do not need that sampled data in real-time. In such cases, the vehicle location data is collected in real-time but sent to the service provider at a later time. A good example of such applications is pay-for-use automobile insurance which computes premiums based on the actual miles driven in a given period.

1.1.3 Pervasive Gaming

A type of application that addresses the consumer market, and the youth segment in particular, is real-world-situated games, or "pervasive gaming." Examples (all from the "It's Alive" company) include Supafly, a location-based virtual soap opera; BotFighters, a location-based game mixing action and roleplay; and X-Fire, a location-based virtual paintball game. These games rely not only on continuous tracking of each subscriber, but also on continuous evaluation of each spatial relationships of the player with other players and with virtual but real-world-located places like "Safe Zone." Using an infrastructure as provided by an exemplary embodiment of the present invention, these spatial relationships would be separated out and composed as rules to be submitted to the exemplary embodiment of the present invention. The remainder of the game logic would execute in a centralized fashion as before. The gaming company retains control of subscriber-management functions, and distributes to the an exemplary embodiment of the present invention only that subscriber information which is used in the spatial rules.

1.1.4 Field Force Dispatch and Security

Many enterprises have large, highly mobile workforces, such as distributors, parcel delivery services, and home-repair services. Some of these may benefit from a continuous awareness of locations of their field force. If, for example, a food distributor is notified automatically when a delivery truck is headed back to the warehouse, it allows the warehouse workers to begin preparing that truck's next delivery. This eliminates the error-prone procedure of the truck driver manually calling back to the warehouse. This service is quite inexpensively delivered with an exemplary embodiment of the present invention, but would be very expensive to implement with a custom-built system.

1.1.5 Emergency Services

Location-based services are especially useful in emergency response applications. The most basic is Enhanced 911, called E-911, which enables a Public Safety Access Point which has received a 911 call to retrieve the location of the caller. An exemplary embodiment of the present invention could enable a wireless carrier to offer extended services to municipalities and other governmental organizations, like locating all emergency responders in the neighborhood of a given location, or delivering warning messages to all subscribers in a given area, or tracking the entire police force to enable rapid identification of the best officers to respond to a given event. Because the cost of an exemplary embodiment of the present invention can be leveraged over hundreds of applications, these services could be offered at a much lower price than the organizations would pay for solutions involving installation of custom hardware in the vehicles of their fleets.

1.1.6 Retail Services

A large retailer may deploy an exemplary embodiment of the present invention as a platform for a host of shopper services, such as delivering a promotion for a new line of baby food when the consumer enters the baby care aisle. The exemplary embodiment of the present invention can allow the retailer to integrate the spatially enabled product databases used in a Product Locator application with the promotional services the retailer wishes to deliver.

1.1.7 Personal Services

Location-based services of value to individual consumers include "Where am I?" and "Where's the nearest . . . ?" Location-based services also include more demanding services such as "Keep track of my child" and "Tell me when a friend enters the mall." An infrastructure provides by an exemplary embodiment of the present invention would enable a wireless carrier or other enterprise to offer all of these services, all on a single platform. New services can be added quickly, at a low incremental cost. Additionally, a consumer could create a rule that would contact the consumer with a message to pick up a prescription when the consumer is within a certain distance from a pharmacy or create a rule that would turn on an Internet-enabled oven to 350 degrees when the consumer is within 10 miles of home.

1.2 Performance Requirements

While some applications may not have performance requirements, all the applications described above have a requirement for a certain timeliness, which can be broadly characterized as response time, as indicated below.

Location-based notification: For a road-hazard alert notification, if it is assumed that cars are traveling at 60 mph, and the alert should be delivered within a one-fourth of a mile, the required response time is 15 seconds. For delivering e-coupons to consumers entering a shopping mall, two minutes may be sufficient.

Telematics: For a pay-for-use automobile insurance example, if the insurance is metered per-mile, and it is assumed that cars are traveling at 60 mph, then the required response time is 60 seconds.

Pervasive gaming: If, for example, it is desired to message players when opposing players are within 100 feet, and a walking speed of 5 mph is assumed, a 15 second response time is required.

Field-force dispatch and security. If a security firm wants updates of security-officer positions every half-minute, the response time is 30 seconds.

The most demanding of these applications require, for an individual subscriber, a response time of 15 seconds, which means that position updates for the subscriber must come no less frequently than every 15 seconds. If it is assumed that a subscriber base of 30 million (approximately the number for the top U.S. wireless carrier), the aggregate position-update rate is two million events per second. This figure far exceeds the capability of current Location-Based Service (LBS) infrastructures, which are designed to serve the requirements of pull-based applications. To serve the requirements of the event-driven, "responsive," applications described above, a new kind of LBS infrastructure is required and is provided by certain embodiments of the present invention.

1.3 A Scalable Solution for Event-Driven Applications

With wireless carriers in the United States rolling out positioning technology in fulfillment of the Enhanced 9-1-1 requirement by the government, which requires the carriers to deliver to Public Safety Access Points the precise position of emergency callers (within 50 meters most of the time), the wireless carries will soon be able to offer wide-area, integrated wireless communications and positioning networks. These networks are thus very attractive bases for an exemplary LBS infrastructure using the present invention.

The systems that carriers have deployed for delivering subscriber position updates to request-driven LBS applications use a gateway-based architecture, as shown in FIG. 1. FIG. 1 shows a communication network 100 comprising a request-driven application 105, a gateway location server 110, a Home Location Register (HLR) 115, and four cell clusters 120, each comprising a Position Detection Technology (PDT) server 125, seven cells (e.g., cells 135-11 through 135-17 in cell cluster 120-1), and a Mobile Switching Center (MSC) 130. Each cell 135 is one area of coverage for a wireless system and each cell 135 communicates with an MSC 130. Each MSC 130 is coupled to the gateway location server 110 via a network link 140. In communication network 100, the PDT servers 100 for are accessed by applications such as application 105 through a gateway such as gateway location server 110. This communication network 100 offers a high degree of convenience for applications 105 and allows the network provider to "throttle" the rate of positioning requests to an acceptable level, but the gateway 110 presents a bottleneck for the event-driven applications 105 described above, because of the high rate of position events required for an acceptable response time.

The architecture of an exemplary embodiment of the present invention addresses this bottleneck by deploying specialized servers alongside the local positioning servers of the carrier. These servers receive subscriber position update events directly from the local positioning servers, requests to which are locally generated based on subscriber presence information received from the MSCs.

Figure 2:
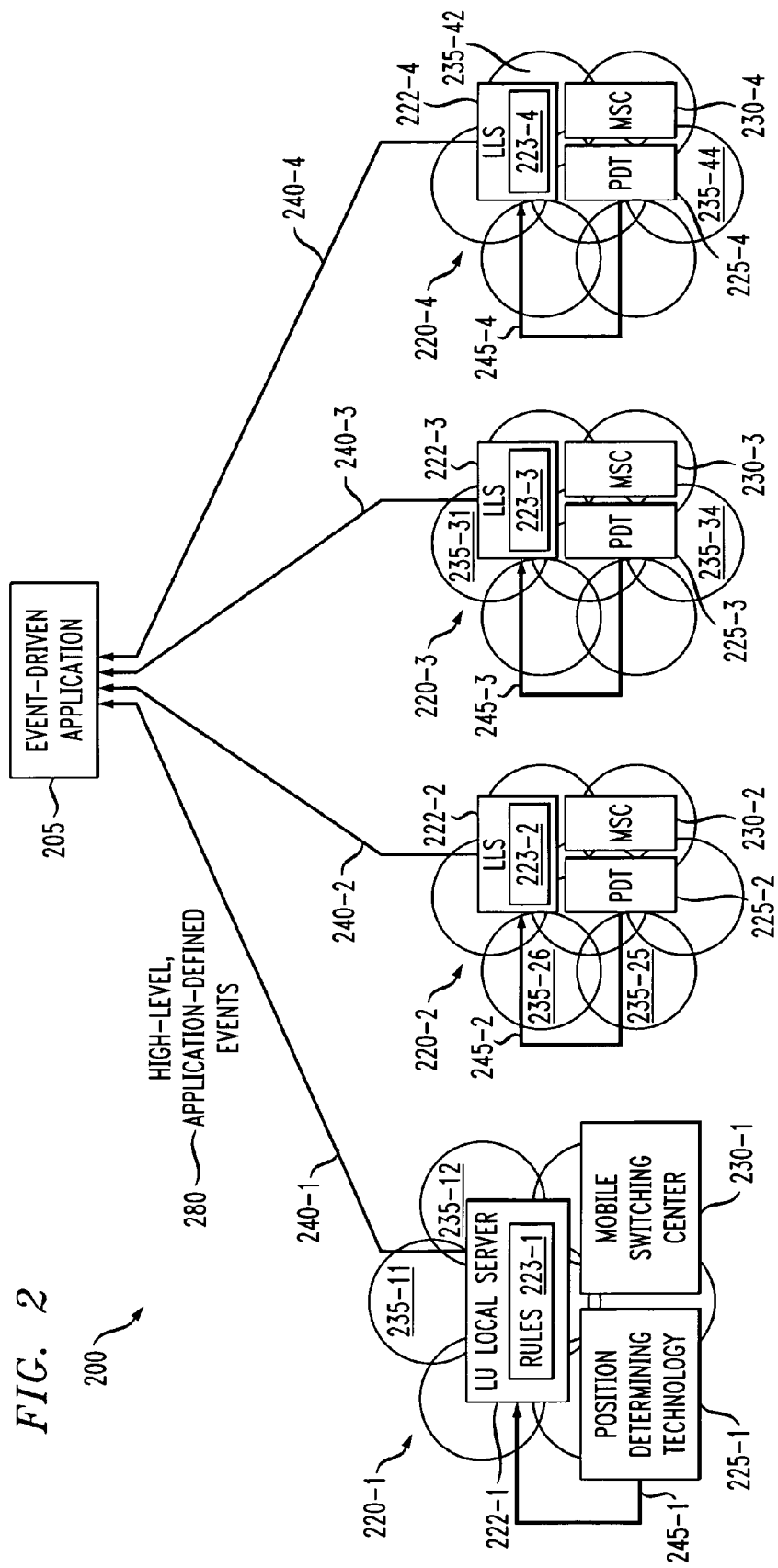
FIG. 2 shows an exemplary block diagram of a communications network able to evaluate spatial rules over a very large mobile population, in accordance with an exemplary embodiment of the present invention.

Turning now to FIG. 2, a communication network 200 is shown that is able to evaluate rules over a very large mobile population. Communication network 200 comprises an event-driven application 205 in communication, through network links 240, with a number of cell clusters 220. Each cell cluster 220 comprises seven cells, a Local Utility (LU) Local Server (LLS) 222, a PDT server 225, and an MSC 230. Each LLS 222 comprises a number of rules 220. Note that while communication network 200 is described in the context of a wireless network of a carrier, the communication network 200 is also fully applicable to indoor deployments as well, perhaps using wireless Local Area Network (LAN) positioning systems. In the example of FIG. 2, the event driven application 205 comprises part of the respond portion of a sense-and-respond application, while the LLS 222 comprises part of the sense portion of a sense-and-respond application.

To make use of this distributed architecture of communication network 200, an exemplary embodiment of the present invention provides a programming mode, described below. In communication network 200, a set of rules 223 operate on low-level subscriber position-update events 245, provided by a corresponding PDT server 225. The rules 223, when triggered, produce high-level, application-defined events 280 that are coupled to the event-driven application 205 through a network link 240. Additionally, there is logic (not shown) in the event-driven application 205 that responds to the high-level events 280 and performs the remaining functions of the application 205. For example, a service for delivering location-based promotions could have one part that would define rules 223 that trigger when any subscriber to the service enters any of the promotion regions defined. The LLS 222 could send a high-level event 280 to the event-driven application 205, typically through the use of one or more messages over a network link 240. The high-level events 280 produced could be of the form "Subscriber X entered region Y." The service would have a second part (e.g., event-driven application 205 or a portion thereof) that would receive the event, generate a promotion (perhaps personalized to the subscriber), and deliver the promotion to the subscriber through some communications channel like Short Message Service (SMS) messages.

It should be appreciated that other ways of distributing LULSs 222 are possible. For example, multiple LULSs 222 may share a single positioning server 225, to handle a very heavy rule load, and also a single LULS 222 may handle position updates from multiple positioning servers 225, for lighter rule loads. Also, a LULS may be deployed for each mobile entity. This could be the case, for example, if there was an on-board LULS 222 in each truck for a trucking fleet, each LULS 222 receiving position updates from the on-board GPS receiver of the truck.

Section 2 describes an exemplary programming model suitable for use in the communication network 200 in more detail. Section 3 describes exemplary functions of the different system components, and Section 4 specifies exemplary semantics of rule evaluation and reporting.

2 Exemplary Programming Model

Figure 3:
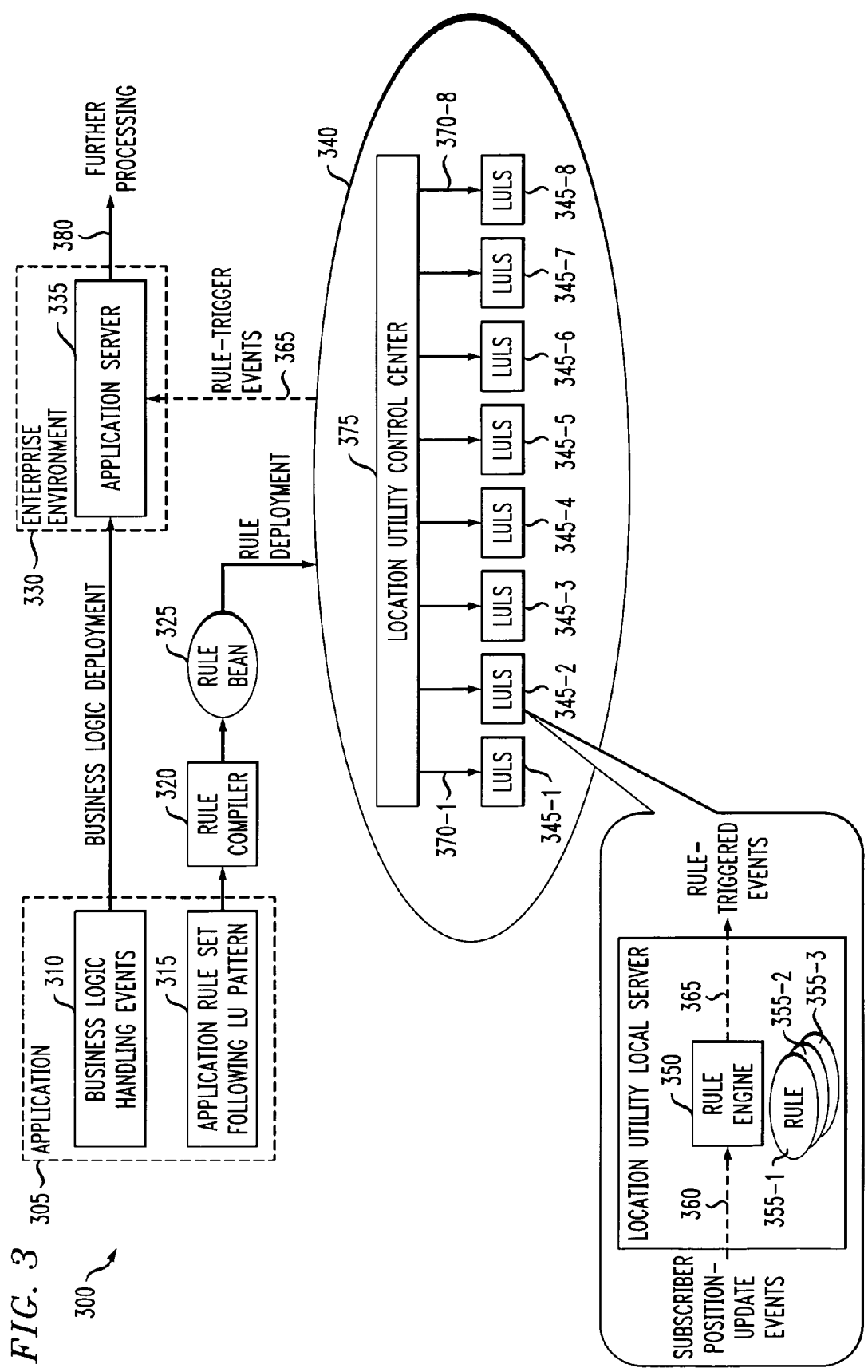
FIG. 3 shows an exemplary block diagram of a communications network coupled to separate applications and enterprise environments.

FIG. 3 shows a communication network 340 in communication with an external network 300. FIG. 3 is a more detailed diagram of communication network 200, shown as communication network 340. External network 300 comprises an application 305, a rule compiler 320, a rule bean 325, and an enterprise environment 330. Application 305 comprises business logic 305 and an application rule set 315. The communication network 340 comprises a location utility control center 375 in communication with a number of Location Utility Local Servers (LULS) 345 through network links 370.

Each LULS 345 comprises a rule engine 350 that operates on rules 355. In the exemplary communication network of FIG. 3, a programming model is provided in which applications comprise two parts: (1) a set of rules 355 that operate on low-level subscriber position-update events 360 and which, when triggered, produce high-level, application-defined events (called rule-triggered events 365); and (2) logic (e.g., in application server 335 of enterprise environment 330) that acts on the rule-triggered events 365, where the logic is deployed within an environment 330 for an enterprise.

As shown in FIG. 3, the set of rules 315 is deployed into the communication network 340 via the location utility control center 375. The rules are compiled by rule compiler 320, which in this example creates rule beans 325, created using a Java Bean. As is known in the art, a Java Bean is a reusable software component that can be visually manipulated in builder tools. FIG. 3 is only exemplary and other techniques for generating rules 355 may be used.

It should be noted that only one application 305 and enterprise environment 330 is shown, but typically there will be multiple applications 305 and enterprise environments 330.

The rule engine 350 receives subscriber position update events 360 and evaluates the rules 355 to produce results (not shown) and then performs actions based on the results. In the example of FIG. 3, the actions are the rule-triggered events 365. The rule-triggered events 365 are communicated to the application server 335, which can then perform further processing 380.

An exemplary embodiment of the present invention offers a high-level programming model based on spatial rules, which in an embodiment are logical expressions involving the location of subscribers and other data, such as geographical locations and regions. A subscriber is one example of an entity, and an entity will typically be synonymous with one or more wireless devices registered to the subscriber. However, there may be situations where the entity is a wireless device and there could be multiple subscribers per device. It could be possible for the wireless device to determine which subscriber is currently using the wireless device. In this case, the entity could have an attribute of the particular subscriber in addition to location of the entity. In the description that follows, the subscriber position updates 360 will typically be considered position updates of a single subscriber. However, it is to be understood that the subscriber position updates 360 can be position updates of an entity such as a wireless device that may be registered to one subscriber or to multiple subscribers.

Rules 355 are evaluated as position updates 360 of subscribers are received; if, for a particular subscriber, a rule is evaluated as "true," a report of that event (e.g., through a rule-triggered event 365) is sent to the application 330 that submitted the rule 355 (e.g., by creating an application rule set 315 and communicating the application rule set 315 to the location utility control center 375).

For scalability, in an exemplary embodiment, rule evaluation is distributed to components such as the LULSs 345 that receive position updates 360 directly. These components are deployed to be as close as possible to the positioning technology, thereby providing scalability, as multiple components will be used for rule evaluation and position determination.

2.1 Exemplary Spatial Rules

A spatial rule, in an exemplary embodiment, is a logical expression (e.g., evaluates to true or false) comprising logical spatial functions combined through logical operators such as AND, OR, NOT, and XOR operators. An exemplary embodiment of the present invention offers a number of built-in functions, and applications may also supply their own.

By way of example, spatial rules typically operate on "subscriber position records" (SPRs), which are structures composed of attributes such as basic location information received from positioning technology, and subscriber class membership fields inserted by certain components of the present invention. Note that not all positioning technologies will be able to supply all fields, but any technology should at a minimum supply the subscriber identification (ID) and the position coordinates. If necessary, speed and bearing may be derived from successive computed positions. An exemplary definition of a subscriber position record is shown below.

SubscriberPositionRecord
SubscriberID sub_id
Date timestamp
Coordinates position
Float speed
Angle bearing
PositionAccuracy pos_accuracy
SpeedAccuracy speed_accuracy
BearingAccuracy brng_accuracy Exemplary grammar for spatial rules is shown in FIG. 4, which shows the primary rule functions. Following each function is one or more parameters defining data associated with the evaluation of the function. The individual functions are described in the following section. Note that the exemplary grammar below defines the structure of location rules, not actual syntax.

The terminals "polygonClass," "pointClass," and "subscriberClass" are identifiers for classes of polygons, points, and subscribers, respectively. Polygons and points are examples of specific kinds of application resources, support for which is discussed in Section 3.5.3.

Higher-level rule functions may be created from trigger expressions that are composed of basic rule functions. For example, a rule function "enroute," which returns true if the position of the subscriber indicates the subscriber is traveling along a given route, may be defined using the containedIn function with the corridor of the route as the polygon parameter, and a scalar function as the bearing of the subscriber.

2.1.2 Exemplary Rule Functions

Illustratively, rule functions (shown in Table 1 below) take as input a subscriber position report, and have parameters associated with them that will also be input to the function. The functions return true or false. Table 1, shown below, provides exemplary built-in rule functions suitable for use with embodiments of the present invention. The term "iff" means "if and only if."

| Rule function | Parameter | Description |
|---|---|---|
| containedIn | polygon | True iff the subscriber position is contained in the given polygon. |
| | polygonClass | True iff the subscriber position is contained in one or more of the given set of polygons, which are referred to via a class identifier. |

-continued

| Rule function | Parameter | Description |
| --- | --- | --- |
| withinDistanceOf | point<br>distance | True iff the subscriber position is within the given distance from the given point. |
| | pointClass+<br>distance | True iff the subscriber position is within the given distance from the given set of points, which are referred to via a class identifier. |
| | subscriber<br>distance | True iff the subscriber position is within the given distance from the position of the given subscriber. |
| | subscriberClass+<br>distance | True iff the subscriber position is within the given distance from the position of one or more of the given subscribers, referred to via a class identifier. |
| hasIdentity | subscriber | True iff the subscriber has the given identity (e.g., Mobile Station ID, MSID). |
| | subscriberClass+ | True iff the subscriber is a member of the one or more of the given classes. |
| <, <=, ==, !=, >=, > | scalar_expr1<br>scalar_expr2 | True iff the given relation between the two scalar expressions is true. |
| timer | period<br>{subscriber \|<br>subscriberClass+} | True iff the timer has expired since the last time the timer expression was evaluated. Evaluation resets the timer. Timers generate explicit trigger events, as described in Section 4.7. |

The following table, Table 2, shows exemplary built-in scalar functions suitable for use with an exemplary embodiment of the present invention.

| Scalar function | Parameter | Description |
| --- | --- | --- |
| SPRField | field name | Returns the named field of the subscriber position record. |
| distanceFrom | point \|<br>susbcriber | Returns the great circle distance from the given subscriber position to the specified point or subscriber. |
| distanceTraveledSince | point {route \|<br>path} | Returns the distance the subscriber has traveled from the given point along the given route or path. A route object is a precomputed route the susbscriber is expected to take; a path is a series of positions recorded for the subscriber. Use of a path object generates an implicit rule that will record the positions of the subscriber. See Section 4.8 for an example of using a path object. |
| | time {route \|<br>path} | Returns the distance the subscriber has traveled since the given time along the given route or path. |
| constant | numeric_literal | A numeric constant. |
| reference | identifier | A reference to a data item in a persistent data store (see Section 2.5). |

2.2 Exemplary Rule Evaluation Model

As described above, in exemplary embodiments of the present invention, rules are evaluated in modules known as Location Utility Local Servers, or LULSs. Another exemplary architecture of the present invention is described in Section 3 below. In general, a LULS serves a subset of the entire subscriber base of a communication network. Subscribers may be associated with a LULS (i.e., the LULS to which their position updates are delivered) by reason of their location, or they may be arbitrarily assigned to a LULS. The semantics of rule evaluation are defined as follows.

Let S be the set of active subscribers served by a LULS. By "active subscribers," it is meant those subscribers from whom the LULS receives position updates. Membership of S changes when subscribers enter or leave the region served by a LULS, when subscribers turn their devices on and off, or when subscribers activate or deactivate the positioning system of their wireless device.

Let P be the set of most-recent position reports of the subscribers in S.

$P=\{p_s | s \in S\}$.

A change in P, due to a new position report, a change in S, or an explicit trigger event generated by a timer (see above), triggers evaluation of all rules at a LULS. Rules are evaluated over the change, which is represented as a subscriber position report. A special report ($p_{-s}$) represents a subscriber who was in S but is no longer active.

The product of evaluating a rule R over P is a set of subscriber IDs $S_R$, a set $P_R$, and a queue of $p_s$, $\Delta P_R$.

$S_R=\{s \in S | R(p_s)\}$; $P_R=\{p_s + \text{evaluation data} | s \in S_R\}$.

By definition, $R(p_{-s})$=False.

The result of evaluating a rule is as follows:

$s \in S_R$ and $\sim R(p_s)$: Remove s from $S_R$; append deleted($p_s$) to $\Delta P_R$;

$s \notin S_R$ and $R(p_s)$: Add s to $S_R$; append inserted($p_s$) to $\Delta P_R$; doReport doReport:

For all applications subscribing to full report: send $P_R$.

For all applications subscribing to delta report: send $\Delta P_R$.

The "evaluation data" referred to above is the expression data that resulted in the rule being evaluated to true. For example, if a containedIn polygonClass expression evaluates to true, the evaluation data contains the identifiers of the polygons belonging to polygonClass which contained the position of the subscriber.

In Section 1, the implementation of these semantics in a set of Java classes and a set of databases is described, in the fuller context of architecture for an exemplary embodiment of the present invention.

2.3 Exemplary Filter Rules

A particular installation of an embodiment of the present invention may have rule elements that are common to all rules evaluated in that installation. For example, a retail store may wish to not do rule evaluation on those customers who have opted out of the location-based coupon service for the store, nor to do rule evaluation on those customers who are moving quickly through the store.

An exemplary embodiment of the present invention can support this requirement through "filter" rules. Filter rules are identical in form to normal rules, but are applied before any normal rules are evaluated. Only if all filter rules return "true" are the set of normal rules evaluated.

Filter rules both offer convenience to a provider of an embodiment of the present invention, in that filter rules obviate the need to include the filtering rules as constant components of normal rules, but they can significantly enhance performance as well in reducing the load of rule evaluation.

2.4 Exemplary Reporting

Applications may specify different forms of reports about mobile subscribers. By way of example, rules may generate either full reports, which comprise the current set of subscriber position records for which a rule was satisfied, or delta reports, which comprise only the subscriber position records that resulted in a change in the result of the rule evaluation with respect to a particular subscriber.

Illustratively, applications may also specify different forms of report aggregation. Options include Immediate, AtInterval, AtIntervalMostRecent, and WillCall. A time period is specified for the latter three. AtInterval directs an exemplary embodiment of the present invention to buffer the reports and deliver them in batch at a specified interval. AtIntervalMostRecent directs an exemplary embodiment of the present invention to hold the most recent reports of a subscriber and deliver the reports to the application at a specified interval. WillCall directs an exemplary embodiment of the present invention to hold reports for up to the given period, which will be retrieved by the application. The oldest reports are discarded if the application does not retrieve the report history within the given period.

2.5 Persistent Data

An exemplary embodiment of the present invention offers a simple, global data store to provide persistence for the data referred to in rule parameters. The global store is accessed implicitly in the polygonClass and pointClass parameters, and may be accessed explicitly as well through the reference function (Section 2.1). The data store may also be accessed from outside rules, through an exemplary application interface described in Section 3.5. Illustratively, each item of data in the data store has an Enterprise ID attribute, which identifies the enterprise controlling the data; an optional Application ID; which identifies the application using the data; and an optional Name, which, in combination with the Enterprise ID and the Application ID, forms a human-readable unique identifier for the data item. In addition, a data item may be assigned a Class ID, which indicates that this data item belongs to the set of data items that all have this same Class ID, and is referred to through the polygon Class and pointClass parameters of various rule functions. In one embodiment, only spatial functions make use of resource classes. Each data item is also assigned a compact unique identifier that persists for the lifetime of the data.

The lifetime of a data item is either indefinite, in which case it is not removed except when done so explicitly, or tied to the lifetime of the rule. This is indicated by setting the Application ID of an item to the rule ID. Data items with "rule" lifetime will be garbage collected (e.g., lazily) when the rule is deleted.

Exemplary embodiments of the present invention can also provide a mobile form of persistent data, which is "attached" to particular subscribers. For example, a rule may wish to record a time of entrance to a particular geographical area for a subscriber so that a rule engine can determine, when evaluating a rule, the total time a subscriber has been in the area. For purposes such as this, an exemplary embodiment of the present invention can provide a persistent data store associated with each subscriber. These data stores "follow" subscribers as the subscribers move throughout the communication network. For example, the persistent data store can be transferred from cell to cell or from MSC to MSC as a subscriber moves through a communication network. The persistent data stores typically have the same persistence (e.g., indefinite lifetime or rule lifetime) as the global data store.

In an exemplary embodiment, an access control mechanism prevents a rule of one enterprise accessing the data of another. The applications of an enterprise may share data freely among themselves.

2.6 Exemplary Rule Reduction

By way of example, when an application submits a rule to the communication network, the location utility control center distributes the rule to all LULSs, each of which then analyzes the rule to determine if the rule can be reduced (e.g., such as being eliminated) because of references to subscribers or locations not in the domain for a particular LULS. The domain for a particular LULS is the current subscriber set and the geographic service region assigned to the LULS. This analysis is known as "static reduction." Example specifics for each rule function are given in Section 4. In an exemplary embodiment, rules that apply only to specific subscribers are evaluated only by those LULSs that serve those subscribers. Thus, a LULS will typically evaluate rules for a subset of the entities subscribed to the communication network or currently in the communication network.

When a subscriber that is the subject of one of these rules is transferred to another LULS, rule evaluation is transferred with them in an exemplary embodiment. Rule transfer is triggered by the same mechanisms that trigger subscriber transfer. The specifics of the mechanisms will differ in different implementations of the LULS. For example, an implementation in the context of a wireless carrier may be expected to make use of Signaling System Seven (SS7) messages. A rule transfer need not involve actual transfer of code, but may involve transfer of application state that is used by a transferred rule.

Certain rule functions involve the locations of other subscribers (WithinDistanceOf, DistanceFrom). Rather than obtaining these locations by request from a central location, LULS nodes that evaluate these kinds of rules enter subscriptions for the locations of subscribers with the Location Utility Control Center (LUCC). These rules are then distributed according to the manner described above.

When a rule is migrated from one LULS to another, subscriptions of the rule should also be updated. LULS nodes accomplish this using a "forward and notify" mechanism, in which a LULS that receives a reports destined for a rule it is no longer evaluating first forwards the report to the LULS to which the report is transferred, and then notifies the sending LULS to change the report destination address.

One exemplary form of the WithinDistanceOf spatial function takes a subscriber class as a parameter. This may be used, for example, in a pervasive gaming application that would enable a game player to be notified whenever a "red team" player came within 100 yards. A rule using this function would enter a subscription to a rule that generated reports of the positions of all subscribers in the "red team" class.

2.7 Exemplary Rule Evaluation

In an exemplary embodiment, each rule is associated with the following data structures:

A map data structure $M_R$ representing the set of subscribers for which the rule evaluated to true on the last SPR (e.g., containing attributes of subscribers) of the subscribers, and the SPR and rule evaluation data associated with each subscriber. ($M_R$ is $S_R + P_R$ from Section 2.2.).

A "delta" queue $D_R$ (representing $\Delta P_R$ from Section 2.2) for each subscription to delta reports for the rule.

A list of applications $A_R$ (as application addresses) subscribing to the rule, along with their aggregation options.

Rule evaluation begins with the receipt of a position update for a subscriber. (It is assumed that there is presence of an environment-specific module to supply the position updates.) For each subscriber position update received by a LULS node, the LULS retrieves the class-membership information of the subscriber from the ASDB and creates a SubscriberPositionRecord object. The SPR is sent to the Rule Engine for evaluation.

In an exemplary embodiment, for each rule R assigned to the LULS, the Rule Engine evaluates R on the SPR. There are four cases:

1. R evaluates to true and the subscriber is in $M_R$: $M_R$ is updated with the new SPR and rule evaluation data. The Rule Engine sends the message R true; no_change to the Report Processor.

2. R evaluates to true and the subscriber is not in $M_R$: The subscriber is added to $M_R$. The SPR, annotated as an addition, is added to all delta queues. The Rule Engine sends the message R true, added(SPR) to the Report Processor.

3. R evaluates to false and the subscriber is in $M_R$: The subscriber is removed from $M_R$. The SPR, annotated as a deletion, is added to all delta queues. The Rule Engine sends the message R false; deleted(SPR) to the Report Processor.

4. R evaluates to false and the subscriber is not in $M_R$: No further action.

Note that an explicit test of membership in $M_R$ may be skipped if the map data structure's add and remove operations perform the membership test internally, but the operations must return a result that indicates whether the element existed prior to the operation.

Report processing is described in the section below.

2.8 Exemplary Report Processing: Aggregation and Distribution

In an embodiment, the ReportOptions object submitted with a rule subscription indicates report aggregation preferences of an application. The table below describes the processing for each preference type, upon receipt of a rule-evaluation result from the Rule Engine, as described above.

| | | |
|---|---|---|
| Immediate | full | If R evaluated to true, send $M_R$ to the application address. |
| | delta | Send $D_R$ to the application address. |
| AtInterval | full | If R evaluated to true, append $M_R$ to the history storage of the subscription. |
| | delta | Append $D_R$ to the history storage of the subscription. |
| AtIntervalMostRecent | full | Do nothing. $M_R$ will be retrieved from the Rule Engine at the given intervals. |
| | delta | Append $D_R$ to the history storage of the subscription, which limits itself to storing only the most recent entry. |
| WillCall | full | If R evaluated to true, append $M_R$ to the history storage of the subscription. After period expires, garbage-collect oldest entries as needed. |
| | delta | Append $D_R$ to the history storage of the subscription. After period expires, garbage-collect oldest entries as needed. |

The report history associated with the willCall aggregation option is generally stored locally and periodically forwarded to the node from which the subscription originated. When the application requests the history, the originating node can send a "flush" request to all LULS nodes, concerning that subscription.

Each rule subscription is associated with an address to which to deliver reports. The address consists of the LU node name where the application or application replicated module is executing, and an identifier for the application.

3 Exemplary System Components and Interfaces

Figure 5:
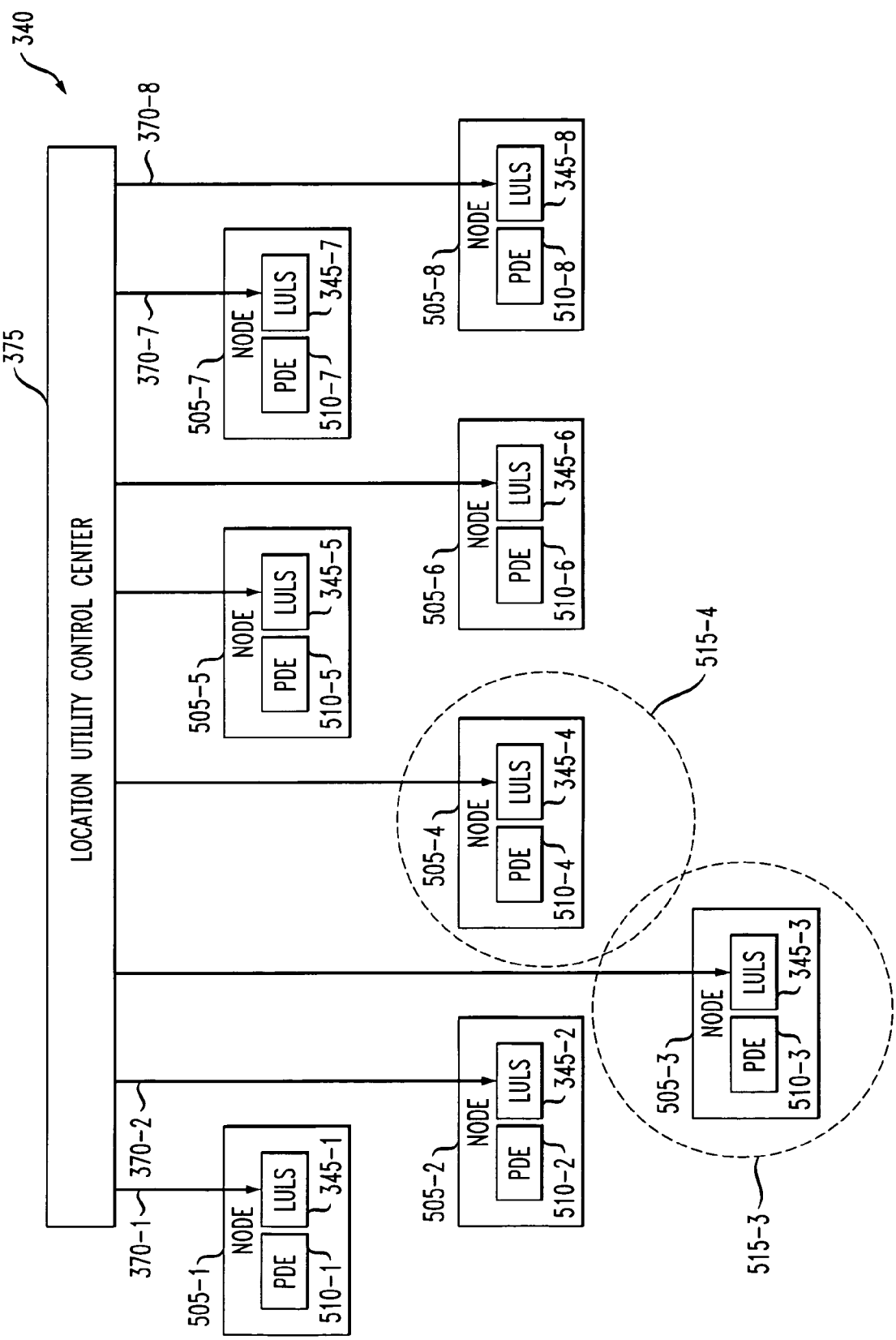
FIG. 5 shows an exemplary block diagram of a communications network having a number of nodes, the communication network able to evaluate spatial rules over a very large mobile population.
Figure 6:
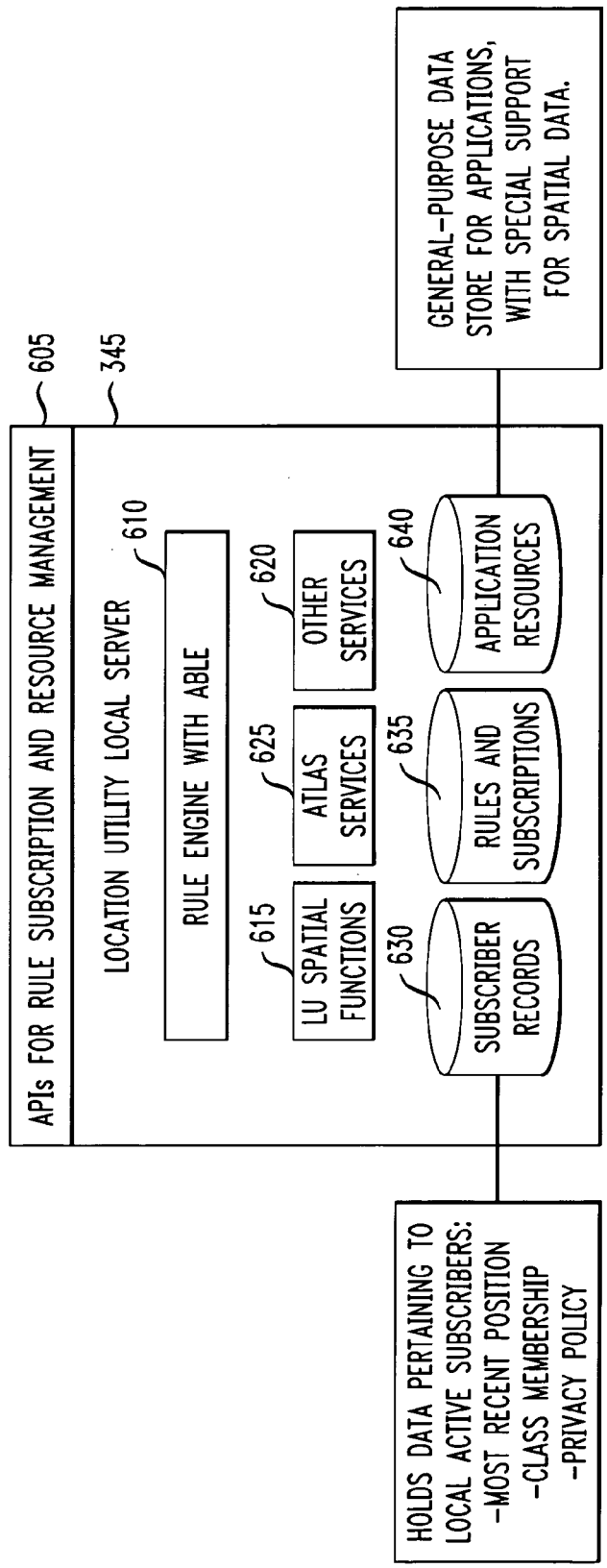
FIG. 6 shows an exemplary block diagram of a location utility local server.

Architecturally, a communication network in an exemplary embodiment comprises a set of Location Utility Local Servers (LULS) and a Location Utility Control Center (LUCC). These are typically arranged as shown in FIG. 5. FIG. 5 shows a different view of communication network 340 of FIG. 3. Communication network 340 of FIG. 5 comprises the LUCC 375 coupled to a number of nodes 505 through network links 370. Each node 305 comprises a Position Determining Equipment (PDE) 510 coupled to a LULS 345. An exemplary LULS is shown in FIG. 6. Each node 505 would also comprise one or more cells (not shown in FIG. 5) and perhaps one or more MSCs (not shown in FIG. 5).

In an embodiment, LULS 345 are distributed for scalability. Application rules (not shown in FIG. 5) are distributed to all nodes 505, but each node 505 typically handles a subset of the entities in the system. Each PDE 510 typically comprises Position Determining Services (PDS) and Subscriber Presence Services (UPS), neither of which is shown in FIG. 5. The PDS supplies position updates of subscribers (e.g., entities) that are known to be in the service region 515 served by the LULS 345. It is to be understood that each LULS 345 will have a service region assigned to a LULS 345, but only service regions 515-3 and 525-4 are shown in FIG. 4. Typically, a service region 515 is defined by one or more cells (not shown in FIG. 5 but shown in FIG. 2), but may also be defined through other techniques. Information defining a service region 515 is supplied by the UPS to the LULS 345, and enables the LULS 345 to evaluate rules over particular subscribers only, if desired.

In the context of the network of a wireless carrier, the function of the UPS would be supplied by the MSC of the carrier; the area served by the LULS 345 would generally be that area served by the MSC, although one LULS 345 might service more than one MSC.

Embodiments of the present invention may be deployed in many contexts, including a wireless network of a wireless carrier, a telematics infrastructure for a trucking company, or the wireless LAN intranet of an enterprise. The present invention is independent of positioning technology, however, and can be deployed in wireless LAN environments, or in sensor-based environments. Embodiments of the present invention are also independent of whether positioning technology is device-based or network-based.

The LUCC 375 and the LULS 345 will typically both implement the same service interface, enabling applications to interact with the communication network 340 via either the centralized LUCC 375 or at each LULS 345 separately. Alternatively, the LUCC 375 and the LULS 345 could have different interfaces.

3.1 An Exemplary LU Local Server

An exemplary LULS 345 is shown in FIG. 6. LULS 345 comprises a number of Application Programmer Interfaces 605, a rule engine 610, in this example with an Agent Building and Learning Environment (ABLE) used for rule evaluation, a Location Utility (LU) spatial functions module 615, an atlas services module 625, an other services module 620, a subscriber records data store 630, a rules and subscriptions data store 635, and an application resources data store 640.

LULS 345 receive the raw subscriber position information from the positioning technology and evaluate the rules stored in the rules and subscriptions data store 635 assigned to a LULS 345. Rules that evaluate to true generate rule-triggered events (not shown in FIG. 6), which are sent to the application (not shown in FIG. 6) that subscribed to the rule. If the application subscribed to a rule through a LULS 345 directly, the rule-triggered event is forwarded to the application directly; if the application subscribed through the LUCC (not shown in FIG. 6), the report is forwarded to the LUCC, which will in turn forward it to the application. To be able to evaluate rules that involve multiple subscribers, LULS 345 may themselves subscribe to rules in other LULSs 345.

Each LULS 345 maintains, in exemplary embodiments, several databases used in rule evaluation. The Active Subscriber Database (ASDB), which is not shown in FIG. 6 but which is stored in a subscriber records data store 630, stores, for instance, the most recent position records and class membership information for all subscribers served by the LULS 345. Upon receiving position information from the positioning technology, the LULS creates, for example, a Subscriber Position Record (not shown), updates the ASDB with it, and then passes the SPR to the rule engine 610 for rule evaluation. A Geometry Resource Database (not shown) can be stored in the application resources data store 635 and stores application-specific objects and their associated geometries (e.g., polygons representing shelf locations for a retailer). The application resource data store 640 stores application-specific objects that do not have associated geometries.

An LULS 345 may not evaluate all rules distributed to it. Knowing which subscribers a LULS 345 is currently serving and the geographic region served, a LULS 345 can, for some rules, decide that the rules can never evaluate to true (e.g., for a particular time period), and reduce (e.g., "deactivate") the rules to reduce its own load. In short, rules that refer to no geometries that lie inside the service region of a LULS 345 and rules that refer to no specific subscribers currently served by a LULS 345, will not be evaluated by that LULS. Because the set of subscribers served by a LULS 345 is dynamic due to subscriber mobility, the evaluation status of a rule is dynamic. A rule pertaining to a particular subscriber is activated in those LULS nodes through whose service regions a subscriber moves, and any subscriber resources attached to the subscriber are moved to that LULS 345.

The LU spatial functions module 615 contains a number of spatial functions (not shown) suitable for use by rules. Additionally, the atlas services module 625 provides services associated with atlas functions (e.g., converting between positions or determining location on a map), and the other services module 620 provides other services for the LULS 345.

The APIs 605 are provided for rule subscription and resource management.

3.2 Exemplary LU Control Center

In certain exemplary embodiments, the LUCC is the locus of control and management functions, and is a primary point of contact for applications to subscribe to rules and set up application resources. The LUCC also can provide an interface for retrieving subscriber positions and any resources applications may have created for them.

When an application subscribes to a rule through the LUCC, the LUCC records the subscription information and forwards the rule to all LULS nodes. Reports from these rules are sent from the LULS nodes to the LUCC, which aggregates them and forwards them to the application. Application resources set up through the LUCC are also forwarded to the LULS nodes, but resources that have associated geometries are forwarded, in an exemplary embodiment, only to those LULS nodes whose geographical domain intersects them. The LUCC maintains a table of LUCC information to enable this.

By way of illustration, an application interface to the LUCC includes a function to immediately retrieve rule evaluation results, which will be retrieved from the LULS nodes where they are maintained. For those rules that are evaluated at all LULS nodes, all nodes will be requested to return the results. For those rules that are evaluated only at certain nodes, because they apply only to the domains of certain nodes, only those nodes will be requested to return the results. The LUCC records which nodes are evaluating which rules in a Rule Assignment Table. Since rule evaluation migrates, as discussed above, rule assignments are dynamic, and are updated by messages from LULS nodes.

3.3 Transferring Subscribers Between LULSs

When a subscriber moves from the coverage region served by one LULS to that of another, the resources that applications may have created for the subscriber should be transferred from one to the other. The LUCC should also be notified of the new serving LULS.

Since an exemplary embodiment of the present invention relies upon presence information from the wireless positioning infrastructure it is using, and will operate with a variety of positioning technologies, it offers a flexible protocol for handling subscriber migration. Specifically, it allows subscriber migration notifications to be distributed and uncoordinated. An exemplary protocol comprises the following messages (where WPI is the Wireless Positioning Infrastructure):

| | |
|---|---|
| WPI_LULS_LEAVE(s) | The WPI notifies a LULS that subscriber s has left its region. The LULS then posts message LULS_LUCC_LEAVE to the LUCC. |

-continued

| | |
|---|---|
| WPI_LULS_ENTER(s) | The WPI notifies a LULS that subscriber s has entered its region. The LULS then posts message LULS_LUCC_ENTER to the LUCC. |
| LULS_LUCC_LEAVE(s, r) | A LULS notifies the LUCC that subscriber s with resources r has left its region. A variant of this message does not include r, in which case the LULS will return the resources upon a later request from the new serving LULS. This reduces the load upon the LUCC when subscriber resources are significantly large. |
| LULS_LUCC_ENTER(s) | A LULS notifies the LUCC that subscriber s with resources r has entered its region. The LUCC returns one of: the resources belonging to s, a "not yet received" indication, or the address of the LULS from which the resources may be requested. |
| LULS_LULS_GETRES(s) | A LULS requests another to return the resources of subscriber s. If the requested LULS has not yet received a WPI_LULS_LEAVE message, this message serves that purpose. |
| LUCC_LULS_PUTRES(s, r) | The LUCC posts the resources r of subscriber s to the LULS now serving s. |

In an exemplary embodiment, the LUCC maintains a table associating all subscribers in the system with the LULS serving them. This enables the LUCC to handle requests for subscriber positions and associated resources.

3.4 Implementation in Different Environments

As mentioned earlier, embodiments of the present invention may be designed to be deployed in a variety of environments. Typically, this will entail not only being able to receive position data from different positioning technologies, which can be accomplished through adapters, but also providing multiple implementations of the LULS. One can anticipate implementations designed to serve the large workloads expected for a wireless carrier, as well as smaller, embedded implementations serving a load from a single subscriber, as in an on-board computer for a vehicle. All implementations generally will provide the same rule-engine functionality, however.

3.5 Application Interfaces

Exemplary embodiments of the present invention can offer a Web service interface to applications for managing their subscriptions and the resources used by their subscriptions, as well as for retrieving the positions of subscribers in the system, and any resources applications may have created for the subscribers. The interface may be implemented by both the LUCC and the LULS. For example, an LUClient class can offer a Java version of the interface, which comprises the following methods.

public void init(String appID);
   public SubscriptionReceipt subscribe(LURule rule, SubscriptionOptions options);
   public SubscriptionReceipt subscribe(String ruleID, SubscriptionOptions options);
   public void cancel(String subscriptionID);
   public FullReport evaluate(LURule rule);
   public FullReport evaluate(String ruleID);
   public String addFilter(LURule rule);
   public void removeFilter(String ruleID);
   public String addResource(ApplicationResource resource);
   public String addResources(ApplicationResource resources);
   public ApplicationResource getResource(String resourceID);
   public void updateResource(ApplicationResource resource);
   public void removeResource(String resourceID);
   public void removeResources(String classID);
   public String listApplicationResources(String appID);
   public String listClassResources(String classID);

Embodiments of the present invention can send rule-triggered events to the application using a range of mechanisms, including Hyper Text Transfer Protocol (HTTP) and plain sockets.

3.5.1 Submitting Rules

Referring back to FIG. 3, an application 300 can submit rules to the communication network 340 by creating, in an embodiment, a Rule object (in the example of FIG. 3, a Rule bean object) using the exemplary classes described in Section 4, and then invoking a subscribe method, passing in (e.g., to the LUCC 375) the Rule object and a SubscriptionOptions object. The SubscriptionOptions object can specify, for example, whether full or delta reports are desired, and what report aggregation option is desired. If the aggregation option requires a callback reference, the callback reference is given in the SubscriptionOptions object as well. The SubscriptionReceipt object received contains an identifier for the subscription as well as an identifier for the rule used in the subscription.

Applications may also subscribe to predefined rules, using a global rule identifier. The use of predefined rules enables applications to share rules, thus reducing the rule evaluation burden on LULS nodes. Applications using predefined rules still receive individual reports.

3.5.2 Immediate Rule Evaluation

Applications may also receive the current results of a rule, without subscribing to it, by using the "evaluate" method. The application may refer to an existing rule using a rule identifier, or the application may supply a new rule to be evaluated. If a new rule, the rule will be evaluated over all position records available, and the results returned.

3.5.3 Application Resources

Section 1.1.2 above gave an example of a rule that triggers when any truck of a company leaves any warehouse of the company. To be evaluated, this rule should have available to it the geographical polygons that represent the warehouse area, which may be specific to that application. These polygons, together with any information the application chooses to associate with them (e.g., name and address), are application resources (e.g., as part of application resources data store 640 of FIG. 6). Because application resources should be available to rules being evaluated in LULS nodes, the application should manage these resources through the service interface of the LULS (e.g., or the LUCC).

4. Exemplary Rule Classes

In an exemplary embodiment, applications express their rule semantics through the instantiation of RuleFunction objects. Exemplary embodiments can use these objects and the parameters contained within them to determine how to distribute rules and how to most efficiently evaluate them. Is should be appreciated that the rule classes described below are exemplary and may be changed by those skilled in the art.

4.1 Rule

An application can expresses a rule through the instantiation and manipulation of a Rule object, which the application then submits to a communication network in a subscribe or evaluate method. Rule extends the RuleFunction class (see below), and its primary component is a RuleFunction object. Rule objects are associated with result sets and reporting mechanisms.

Application programmers may also associate SideEffect objects with Rule objects. SideEffect objects execute locally (e.g., to the LULS), and implement any side effects that should happen as the result of the rule function evaluating to true. For example, an application that uses a rule that evaluates to true when a subscriber has traveled a certain distance, would specify a side effect that "zeros" the mileage counter at that time.

4.2 RuleFunction

The RuleFunction interface is implemented by all spatial rule classes. RuleFunction may also be implemented by application-defined rules. Its methods are:

public RuleResult evaluate(SubscriberPositionRecord spr, EvaluationContext ec); and public RuleResult reduce(EvaluationContext ec).

RuleResult contains a boolean indicating the logical result of evaluating the rule, as well as the expression data used in the evaluation. SubscriberPositionRecord is as defined in Section 2.1. EvaluationContext gives access to the various resources of the LULS needed for rule evaluation. The reduce method implements the static reduction analysis discussed in Section 1.1. The analysis begins by calling reduce on the RuleFunction member of the Rule object, which will result in recursive reduce calls on all nested RuleFunction objects. The semantics of reduce is defined for each RuleFunction, below.

4.3 Logical

The Logical.AND, Logical.OR, and Logical.NOT classes extend the RuleFunction class and enable programmers to compose logical expressions of RuleFunction objects through AND, OR, and NOT operators.

Exemplary embodiments of the present invention can try to optimize rule expressions based on knowledge of the cost of evaluating the various built-in rule functions described below. Logical classes also offer programmers methods to defeat optimizations, by forcing rule evaluation order and turning off short-circuit evaluation.

Below is an example of an expression that results in all park rangers within a park's boundaries.

RuleFunction t1=new HasIdentity("USNPS-Ranger");

RuleFunction t2=new ContainedIn("usnps:Yellowstone"); and

RuleExpression findRanger=new Logical.AND(t1, t2).

This expression, once created, can be assigned as the expression of a rule, and the rule can be submitted to the utility for evaluation (as described in Section 3.5.1).

4.3.1 Static Reduction

Static reduction comprises evaluating the constructed expression on the results of reduce calls on the expression components.

4.4 ContainedIn

The ContainedIn.Polygon and ContainedIn.PolygonClass RuleFunction classes evaluate whether a given subscriber position lies within a specified polygon or polygon class, respectively. Specifying a polygon class is equivalent to creating a separate expression and rule for each polygon in the class.

4.3.1 Static Reduction

The reduce method on the ContainedIn.Polygon class returns true if the polygon parameter of the object intersects the service region of the LULS, and false if not. The reduce method on the ContainedIn.PolygonClass class returns true if any polygon belonging to the polygon class parameter intersects the LULS's service region, and false if not.

4.5 WithinDistanceOf

The WithinDistanceOf.Subscriber, WithinDistanceOf.SubscriberClass, WithinDistanceOf.Point, and WithinDistanceOf.PointClass RuleFunction classes evaluate whether a given subscriber position is within a specified distance from a specified subscriber, subscriber class, point, or point class, respectively. Specifying a subscriber class or point class is equivalent to creating a separate expression and rule for each subscriber or point in the class.

When WithinDistanceOf expressions involve other subscriber positions, then the LULS node evaluating the rule containing the expression should obtain the positions of those subscribers. If the LULS does not have the needed position, it should request it from the LULS serving that subscriber. The system that enables the identification of this LULS is described in Section 3.2.

4.5.1 Static Reduction

The reduce methods on the WithinDistanceOf.Subscriber and WithinDistanceOf.SubscriberClass classes at present evaluate to true. Precise analysis is possible.

The reduce methods on the WithinDistanceOf.Point and WithinDistanceOf.PointClass classes evaluate to true when the LULS's service coverage region intersects the circle defined by the given point and given distance (e.g., if the distance is a constant), and false otherwise.

4.6 HasIdentity

The HasIdentity RuleFunction class evaluates whether the given subscriber has the specified identity (MSID), or belongs to the specified subscriber class. A subscriber class is a construct and is used to represent facts about the subscriber, both long-term and transient. For example, a subscriber class may be used to represent that a given subscriber is a certified emergency response technician, and may also be used to represent the fact that the same subscriber has been dispatched to an emergency and whose location should be tracked.

Subscriber classes are represented by an annotation of an information record for a subscriber stored in a LULS database. This is described further in Section 3.1.

Exemplary embodiments of the present invention can create for each rule a subscriber class that represents those subscribers for which the rule evaluated to true for the last received position records of the subscriber. This class is used for efficient maintenance of $S_R$ (Section 2.2).

4.6.1 Static Reduction

The HasIdentity reduce method returns true if the subscriber ID parameter is a member of the active subscriber set for a Rule, and false if not.

4.7 Timer

A Timer RuleFunction object evaluates to true after a specified time period has elapsed. Once a timer has expired it remains expired until it is evaluated, after which it is reset.

Expiration of a time generates an explicit trigger event. The event consists of subscriber position reports for those subscribers identified in the timer's parameter.

4.8 Relational

The Relational RuleFunction classes represent relational operators (<, <=, ==, !=, >=, >) between scalar functions. Below is an example of a rule expression that evaluates to true when a certain distance is traveled. Scalar functions used in the example are described below.

// chkPtID is the ID of a Point resource to which distance is measured DistanceTraveledSince dist=new DistanceTraveledSince.Point(chkPtID);
    ScalarFunction tenKm=new ScalarConstant (10.0*1000.0); and
    Relational goneTenKm=new Relational.GT(dist, tenKm).

The expression goneTenKm evaluates to true when the subscriber has gone 10 kilometers since the last time the expression was true.

4.8.1 Static Reduction

Static reduction of Relational rule functions depends on comparisons of the range values returned by the reduce method for two ScalarFunction components of a Relational rule function. This comparison is described in Appendix A.

4.9 ScalarFunction

The ScalarFunction interface is implemented by functions that return a scalar. The Java basic type double is used to represent scalars. ScalarFunction has two methods, below.

public ScalarResult evaluate(SubscriberPositionRecord spr, EvaluationContext ec); and
    public ScalarRange reduce(EvaluationContext ec).

A ScalarResult object contains a double value representing the result of the function, as well as the expression data used in computing the function. Each ScalarFunction class (except ScalarConstant) has a corresponding ScalarResult subclass. The reduce method returns a ScalarRange class, which extends the ScalarResult class, and which represents the range of values—if known—a function may take on for a given LULS domain, as represented by the given EvaluationContext object. If not known, the method returns null.

4.10 SPRField

The SPRField scalar function returns a scalar value from the subscriber position record. A set of class constants represent the available fields: X, Y, SPEED, BEARING, TIMESTAMP, etc. The SPRField is a convenience class that the programmer may use in place of a class definition such as:

```
ScalarFunction speed = new ScalarFunction( ) {
    public double evaluate(SubscriberPositionRecord spr) {
        return spr.getSpeed( );
    }};
```

4.11 ApplicationResource, ScalarResource, GeometryResource

ApplicationResource is a general-purpose class that gives access to a data store local to the LULS. It offers generic, Object-based get/set accessors. ScalarResource is a convenience class that wraps a ApplicationResource class and implements the ScalarFunction interface. GeometryResource extends ApplicationResource and allows an application to associate a resource with a geometry, such as a point or polygon.

4.12 DistanceFrom

The DistanceFrom class computes the great-circle distance from the given subscriber position to the specified subscriber position or static location. Static locations are referred to via a ApplicationResource object. Positions of mobile subscribers are retrieved via the technique described in Section 1.1.

4.13 DistanceTraveledSince

The DistanceTraveledSince scalar function computes the distance a subscriber has traveled since the specified geographical position or point in time. The class requires either a precomputed route or a RecordedPath object (see below) to be specified. An example of this function appears in Section 4.8.

4.14 RecordedPath

The RecordedPath class is a general-purpose class used to record a subscriber's path. Functionally, it is equivalent to a HasIdentity function that has a side effect that records the subscriber's position. The RecordedPath object is offered as a built-in class because an exemplary embodiment can use RecordedPath object in the DistanceTraveledSince class.

5 Exemplary Method and Computer System

Figure 7:
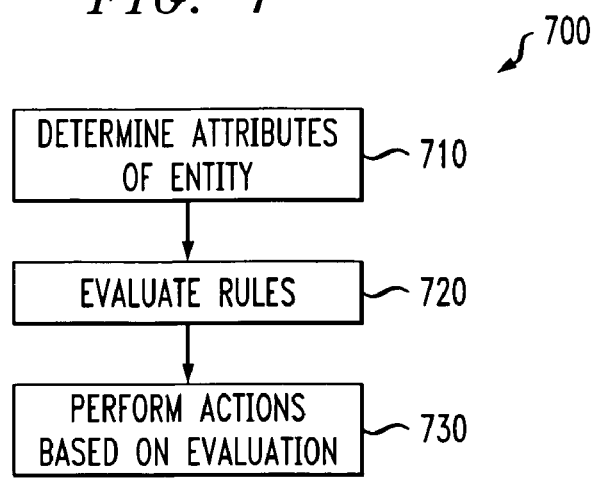
FIG. 7 is an exemplary method for evaluating rules over a mobile population.

Turning now to FIG. 7, an exemplary method 700 for evaluating spatial rules over a mobile population is shown. Method 700 is performed by a Location Utility Local Server. Method 700 begins in step 710, when attributes of an entity are determined. One attribute will be the location of the entity, and the location can be in any number of forms, such as a global positioning form or textual form. Other attributes, by way of example, can include items in the SubscriberPositionRecord (see section 2.1) such as a particular subscriber ID, date, speed, and bearing of the entity. Additional attributes could be, for instance, phone type, group ID into which subscriber ID falls, or preferences of the subscriber.

In step 720, the rules are evaluated. As described above (e.g., sections 2.1 and 2.3), the rules can be a number of different types of rules. Rule evaluation is described in, for example, sections 2.2 and 2.7 above. Typically, rule evaluation will result in a number of results and particular states (e.g., true or false, although other states can be added if desired). Exemplary results are described in sections 2.2 and 2.7 above. As described above, the results could include data structures indicating which subscribers (e.g., entities) have had their attributes evaluate to true or which subscribers have had changes in a state of a corresponding rule (e.g., from true for the last evaluation of the rule to false for the current evaluation of the rule).

In step 730, actions are performed based on the evaluation. As described in section 2.7 above, the actions include informing an application of the subscribers that have had corresponding rules evaluate to true, based on the attributes of the subscribers, or which subscribers have had changes in the state of a corresponding rule. Other actions include updating databases based on the results, and performing other rule-triggered events (see FIG. 3). For instance, a rule-triggered event could be any application-defined event. For example, the application might include an application-defined event, "If subscriber A leaves area B, send message C." The message C is an action (e.g., a rule-triggered event) sent to the application in step 730. Persistent data can also be updated or transferred in step 730.

Figure 8:
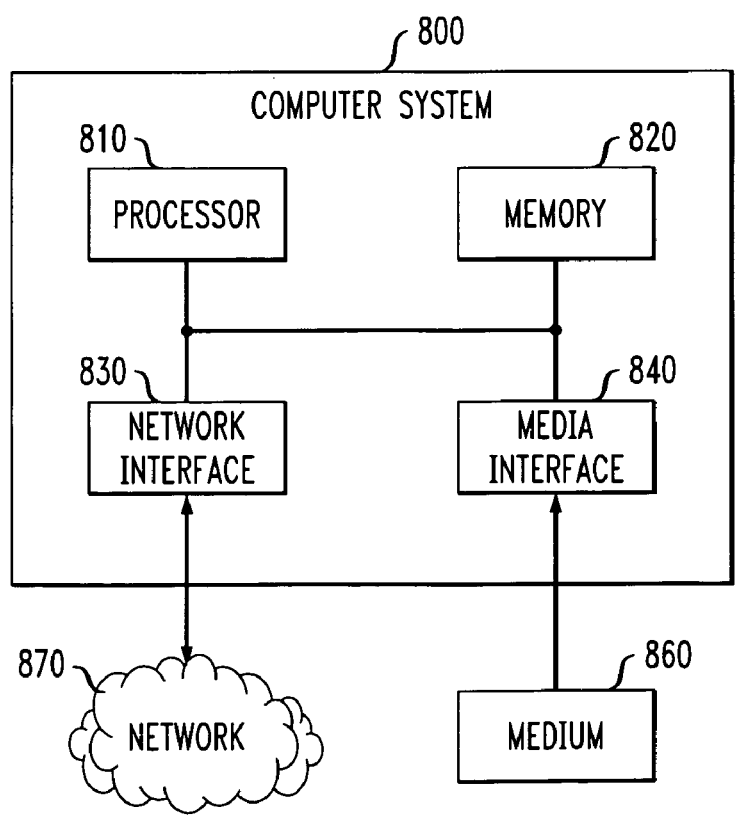
FIG. 8 shows an exemplary block diagram of a computer system suitable for use when implementing portions of a communications network.

Referring now to FIG. 8, a computer system 800 is shown that is suitable for implementing the LUCC, LULS or some combination thereof. Computer system 800 comprises a processor 810 that is singular or distributed, a memory 820 that is singular or distributed, a network interface 830, and a media interface 840. The network interface 830 couples to a network 870 (e.g., portions of network 340 of FIG. 3). The media interface 840 couples to a computer readable medium 860, which comprises one or more programs (not shown) which, when implemented, carry out portions or all of the present invention. For example, the rule engine 610 of FIG. 6 could be part of a program placed onto medium 860. The program, when loaded into processor 810 (typically from memory 820), will configure the processor 810 to implement the rule engine 610.

It is to be understood that the embodiments and variations shown and described herein are merely illustrative of the principles of this invention and that various modifications may be implemented by those skilled in the art without departing from the scope and spirit of the invention.

APPENDIX A. EXAMPLE SCALAR RANGE COMPARISON FOR RELATIONAL RULE-FUNCTION REDUCTION

Static reduction of Relational rule functions depends on comparisons of the range values returned by the reduce method for two ScalarFunction components of a Relational rule function. Given two range values, there are six cases of comparison in this example that are significant to Relational rule functions.

| Case | Symbol |
|---|---|
| The left range is wholly less than the right range. | RANGELT |
| The upper end of the left range is equal to the lower end of the right range. | RANGELE |
| The two ranges have a non-zero overlap. | OVERLAP |
| Both ranges consist of single points, and are equal. | EQPTS |
| The lower end of the left range is equal to the upper end of the right range. | RANGEGE |
| The left range is wholly greater than the right range. | RANGEGT |

The table below shows the result of static reduction for each of the Relational rule function classes, for each of the cases above. 'T' and 'F' mean that the function can be reduced to "true" and "false," respectively; '—' indicates that the function cannot be reduced.

| | Case | | | | | |
|---|---|---|---|---|---|---|
| | LT | LE | EQ | NE | GE | GT |
| RANGELT | T | T | F | T | F | F |
| RANGELE | — | T | — | — | — | F |
| OVERLAP | — | — | — | — | — | — |
| EQPTS | F | T | T | F | T | F |
| RANGEGE | F | — | — | — | T | — |
| RANGEGT | F | F | F | T | T | T |

APPENDIX B. SAMPLE APPLICATION

Below is a sample application using the Relational example from Section 4.8. Given a subscriber ID, the application creates and subscribes to a rule that fires every time the subscriber travels ten kilometers. For brevity, exception handling is not shown. In the example given below, square brackets have been replaced with the characters { and }.

```
import com.ibm.locutil.*;
import com.ibm.locutil.rules.*;
public class SampleApp1 {
    private static String appID = "myApp";
    // recvAddr must be modified to be your own hostname
    private static String recvAddr = "socket://myhostname:9988";
    // luAddr must be modified to be an address of an actual LUCC or LULS.
    private static String luAddr = "http://luhostname/locutil";
    public static void main(String{} args) {
        // MSID is first argument
        String myMSID = args{0};
        try{
            // Create LU client and connect to LOU
            LUClient luClient = new LUClient(appID, luAddr);
            // Create the 'checkpoint' resource used by the application. This is
            // the point the distance is measured from.
            ApplicationResource checkPt =
                    new ApplicationResource(appID,
                            new Point("EPSG:4326", 0.0, 0.0), true);
            String chkPtID = luClient.addResource(checkPt);
            // Create a rule that fires every time the subscriber goes ten km.
            LURule myRule = new LURule(new GoneTenKilometers(myMSID, chkPtID));
            // Create an object to receive the reports
            SocketReportReceiver rcvr =
                    new SocketReportReceiver(9988, new MyListener( ));
            // Subscribe to the rule using options that tell the LU to start
            // evaluating the rule immediately, evaluate it forever (i.e., must
            // be canceled explicitly, and send full reports (the only kind that
            // makes sense for this rule) and send them immediately. Reports are
            // to be sent to the given socket, which will be received by the
            // SocketReportReceiver object created above.
            luClient.subscribe(myRule,
                    new SubscriptionOptions(null, null,
                            SubscriptionOptions.FULLREPORTS,
                            SubscriptionOptions.IMMEDIATE,
                        recvAddr));
        } catch (LUException lue) {
            lue.printStackTrace( );
        }
    }
```

-continued

```
        }
        private static class GoneTenKilometers extends AbstractRuleFunction {
            private RuleFunction myFunc;
            private String checkPtID;
            public GoneTenKilometers(String myMSID, String checkPtID) {
                this.checkPtID = checkPtID;
                DistanceTraveledSince dist =
                        newDistanceTraveledSince.Point(checkPtID);
                ScalarFunction tenKm = new ScalarConstant(10.0 * 1000.0);
                Relational goneTenKm = new Relational.GT(dist, tenKm);
                HasIdentity isMe = new HasIdentity(myMSID);
                myFunc = new Logical.AND(isMe, goneTenKm);
            }
            public RuleResult evaluateFunction(SubscriberPositionRecord spr,
                                    EvaluationContext ec)
                            throws LUException
            {
                RuleResult rr = myFunc.evaluate(spr, ec);
                if (rr.getLogicalValue( )) {
                    ResourceSet resSet = ec.getGeneralResourceSet( );
                    resSet.updateResource(checkPtID, spr.getPosition( ));
                }
                return rr;
            }
            public RuleResult reduceFunction(EvaluationContext ec) throws LUException {
                return myFunc.reduce(ec);
            }
        }
    }
    private static class MyListener implements SubscriptionListener {
        public void receiveReport(RuleReport report) {
            System.out.println("Went ten miles");
        }
    }
}
```

What is claimed is:

1. In a communication network, a method for evaluating rules, the method comprising the steps of:
receiving one or more rules from an application;
sending a trigger to said application based on said one or more rules;
determining one or more attributes of an entity, at least one of the attributes comprising location of the entity;
evaluating said one or more rules to produce one or more results, each of the one or more rules comprising one or more functions that operate on the one or more attributes of the entity, wherein the one or more functions comprise a plurality of functions combined through logical operators and wherein each of the one or more functions evaluates to one of a plurality of states and wherein the rule evaluates to one of the plurality of states; and
performing, based on the evaluation of the one or more rules, one or more actions specified for the one or more rules, wherein at least one of the actions comprises communicating the one or more results to said application.

2. The method of claim 1, wherein there are a plurality of entities, each entity corresponding to one or more attributes, and wherein the one or more results comprise indications of which entities of the plurality of entities have attributes satisfying the one or more rules.

3. The method of claim 1, wherein there are a plurality of entities, each entity corresponding to one or more attributes, and wherein the one or more results comprise indications of which entities of the plurality of entities have attributes resulting in a change in status of the evaluation of the one or more rules between a first evaluation of the one or more rules and a second evaluation of the one or more rules.

4. The method of claim 1, wherein the communication network comprises a wireless portion, the entity comprises a wireless device, and the entity communicates within the wireless portion of the communication network.

5. The method of claim 1, wherein:
there are a plurality of entities subscribed to the communication network; and
the step of evaluating is performed by a plurality of nodes in the communication network, each node evaluating rules over a subset of the entities.

6. The method of claim 5, wherein the plurality of entities are registered with the communication network so as to be able to communicate with portions of the communication network.

7. The method of claim 1, further comprising the steps of associating a side effect with the one or more rules and performing the side effect if the one or more rules evaluate to a predetermined one of a plurality of states.

8. The method of claim 1, further comprising the steps of:
receiving a plurality of supplied rules;
determining if evaluation of one or more given rules of the supplied rules produces one or more constant results for at least a selected time period; and
preventing evaluation of the one or more given rules for the selected time period.

9. The method of claim 8, wherein the step of preventing evaluation further comprises the step of removing the one or more given rules from the plurality of supplied rules.

10. The method of claim 1, wherein the step of determining one or more attributes of an entity comprises determining the location of the entity.

11. The method of claim 1, wherein the one or more attributes comprise a plurality of attributes, the plurality of attributes further comprising one or more of the following: a mobile station identification, a user identification, a subscriber class, a bearing, and a speed.

12. The method of claim 1, wherein the communication network comprises a plurality of nodes and wherein each of the plurality of nodes performs the steps of determining, evaluating, and performing one or more actions.

13. The method of claim 12, wherein the one or more rules comprise a plurality of rules, wherein a plurality of entities are associated with the communication network, and wherein the method further comprises the step of communicating the plurality of rules to each of the nodes.

14. The method of claim 13, wherein each of the nodes corresponds to a defined coverage region, and wherein the step of evaluating further comprises the step of a given one of the plurality of nodes evaluating rules for entities in a defined coverage region corresponding to the given node.

15. The method of claim 13, wherein each of the entities has a corresponding set of one or more rules, wherein a given one of the nodes determines which of the plurality of entities are within a coverage region corresponding to the given node, and wherein the given node performs the steps of determining one or more attributes of the entity, evaluating, and performing one or more actions for those nodes of the plurality of nodes that are within the coverage region and does not perform the steps of determining one or more attributes of the entity, evaluating, and performing one or more actions for those nodes of the plurality of nodes that are not within the coverage region.

16. The method of claim 13, wherein a first node corresponds to a first defined coverage region, a second node corresponds to a second defined coverage region, a given entity has persistent data associated with the given entity, and the first node communicates the persistent data to the second node in response to the given entity leaving the first defined coverage region and entering the second defined coverage region.

17. The method of claim 1, wherein the step of performing one or more actions specified for the one or more rules further comprises the step of sending one or more messages to an application based on the one or more results, the one or more messages corresponding to the one or more results.

18. The method of claim 1, wherein the one or more rules correspond to a plurality of entities, the step of evaluating further comprises the step of evaluating the one or more rules for the plurality of entities to produce one or more results, wherein the one or more results comprise one or more indications as to which of the plurality of entities has attributes satisfying the one or more rules, and wherein the step of performing further comprises the step of communicating one or more messages having the one or more indications to an application.

19. The method of claim 18, wherein the one or more indications comprise a subscriber position record for at least one of the entities meeting the one or more rules.

20. The method of claim 1, wherein the one or more attributes further comprises a subscriber identification, and wherein the one or more rules correspond to one or more geographical regions or one or more subscriber identifications.

21. The method of claim 1, wherein the step of performing, based on the one or more results, one or more actions specified for the one or more rules further comprises the step of communicating a rule-triggered event to the application, wherein the rule-triggered event is specified for the one or more rules and corresponds to the entity.

22. An article of manufacture for evaluating rules, the article of manufacture comprising:
a computer readable storage medium containing one or more programs which when executed implement the steps of:
receiving one or more rules from an application; and
sending a trigger to said application based on said one or more rules determining one or more attributes of an entity, at least one of the attributes comprising location of the entity;
evaluating said one or more rules to produce one or more results, each of the one or more rules comprising one or more functions that operate on the one or more attributes of the entity, wherein the one or more functions comprise a plurality of functions combined through logical operators and wherein each of the one or more functions evaluates to one of a plurality of states and wherein the rule evaluates to one of the plurality of states; and
performing, based on the evaluation of the one or more rules, one or more actions specified for the one or more rules, wherein at least one of the actions comprises communicating the one or more results to said application.

23. The article of manufacture of claim 22, wherein said one or more programs which when executed further implement the steps of:
determining one or more attributes of an entity, at least one of the attributes comprising location of the entity;
evaluating said one or more rules to produce one or more results, each of the one or more rules comprising one or more functions that operate on the one or more attributes of the entity; and
performing, based on the evaluation of the one or more results, one or more actions specified for the one or more rules, wherein at least one of the actions comprises communicating the one or more results to said application.

24. In a communication network, an apparatus for evaluating rules, the apparatus comprising:
at least one computer system comprising:
one or more memories; and
one or more processors coupled to the one or more memories, the one or more processors configured:
receive one or more rules from an application;
send a trigger to said application based on said one or more rules;
determine one or more attributes of an entity, at least one of the attributes comprising location of the entity;
evaluate said one or more rules to produce one or more results, each of the one or more rules comprising one or more functions that operate on the one or more attributes of the entity, wherein the one or more functions comprise a plurality of functions combined through logical operators and wherein each of the one or more functions evaluates to one of a plurality of states and wherein the rule evaluates to one of the plurality of states; and
perform, based on the evaluation of the one or more rules, one or more actions specified for the one or more rules, wherein at least one of the actions comprises communicating the one or more results to said application.

25. The apparatus of claim 24, wherein the one or more processors are further configured:
to determine one or more attributes of an entity, at least one of the attributes comprising location of the entity;
to evaluate said one or more rules to produce one or more results, each of the one or more rules comprising one or more functions that operate on the one or more attributes of the entity; and
to perform, based on the evaluation of the one or more results, one or more actions specified for the one or more rules, wherein at least one of the actions comprises communicating the one or more results to said application.

26. The apparatus of claim 25, wherein the one or more functions comprise a plurality of functions combined through logical operators.

27. The apparatus of claim 25, wherein there are a plurality of entities, each entity corresponding to one or more attributes, and wherein the one or more results comprise indications of which entities of the plurality of entities have attributes satisfying the one or more rules.

28. The apparatus of claim 25, wherein there are a plurality of entities, each entity corresponding to one or more attributes, and wherein the one or more results comprise indications of which entities of the plurality of entities have attributes resulting in a change in status of the evaluation of the one or more rules between a first evaluation of the one or more rules and a second evaluation of the one or more rules.

29. The apparatus of claim 25, wherein the communication network comprises a wireless portion, the entity comprises a wireless device, and the entity communicates within the wireless portion of the communication network.

30. The apparatus of claim 25, wherein:
there are a plurality of entities subscribed to the communication network;
the communication system comprises a plurality of nodes;
the at least one computer system comprises a plurality of computer systems, each node communicating with one or more of the computer systems; and
each computer system is adapted to evaluate rules over a subset of the entities.

31. The apparatus of claim 25, wherein the processor is further configured:
to receive a plurality of supplied rules;
to determine if evaluation of one or more given rules of the supplied rules produces one or more constant results for at least a selected time period; and
to prevent evaluation of the one or more given rules for the selected time period.

32. The apparatus of claim 25, wherein the one or more attributes comprise a plurality of attributes, the plurality of attributes further comprising one or more of the following: a mobile station identification, a user identification, a subscriber class, a bearing, and a speed.

33. The apparatus of claim 25, wherein the at least one computer system comprises a first plurality of computer systems, the communication network comprises a second plurality of nodes, one or more of the nodes communicate with one or more of the computer systems, and each of the plurality of computer systems is adapted to determine, evaluate, and perform one or more actions.

34. The apparatus of claim 25, wherein the one or more processors are further configured, when performing, to send one or more messages to an application based on the one or more results, the one or more messages corresponding to the one or more results.

35. The apparatus of claim 25, wherein the one or more rules correspond to a plurality of entities, the one or more processors are further configured, when evaluating, to evaluate the one or more rules for the plurality of entities to produce one or more results, wherein the one or more results comprise one or more indications as to which of the plurality of entities has attributes satisfying the one or more rules, and wherein the one or more processors are further configured, when performing, to communicate one or more messages having the one or more indications to an application.

36. In a communication network, an apparatus for evaluating rules, the apparatus comprising:
at least one computer system comprising:
one or more memories; and
one or more processors coupled to the one or more memories, the one or more processors configured:
receive one or more rules in one or more nodes; and
reduce said one or more rules based on subscribers associated with one or more of said nodes, wherein the communication network comprises a plurality of nodes and wherein each of the plurality of nodes performs the steps of determining, evaluating, and performing one or more actions, wherein the one or more rules comprise a plurality of rules, wherein a plurality of entities are associated with the communication network, and wherein the method further comprises the step of communicating the plurality of rules to each of the nodes, wherein each of the entities has a corresponding set of one or more rules, wherein a given one of the nodes determines which of the plurality of entities are within a coverage region corresponding to the given node, and wherein the given node performs the steps of determining one or more attributes of the entity, evaluating, and performing one or more actions for those nodes of the plurality of nodes that are within the coverage region and does not perform the steps of determining one or more attributes of the entity, evaluating, and performing one or more actions for those nodes of the plurality of nodes that are not within the coverage region.

37. The apparatus of claim 36, wherein said rule reduction is based on a location of a node.

38. The apparatus of claim 36, wherein said rule reduction is based on one or more attributes of one or more of said subscribers.

39. The apparatus of claim 36, wherein said rule reduction is based on a movement of one or more of said subscribers.

40. In a communication network, a method for evaluating rules, the method comprising the steps of:
receiving one or more rules in one or more nodes; and
reducing said one or more rules based on subscribers associated with one or more of said nodes, wherein the communication network comprises a plurality of nodes and wherein each of the plurality of nodes performs the steps of determining, evaluating, and performing one or more actions, wherein the one or more rules comprise a plurality of rules, wherein a plurality of entities are associated with the communication network, and wherein the method further comprises the step of communicating the plurality of rules to each of the nodes, wherein each of the entities has a corresponding set of one or more rules, wherein a given one of the nodes determines which of the plurality of entities are within a coverage region corresponding to the given node, and wherein the given node performs the steps of determining one or more attributes of the entity, evaluating, and performing one or more actions for those nodes of the plurality of nodes that are within the coverage region and does not perform the steps of determining one or more attributes of the entity, evaluating, and performing one or more actions for those nodes of the plurality of nodes that are not within the coverage region.

41. The method of claim 40, wherein said rule reduction is based on a location of a node.

42. The method of claim 40, wherein said rule reduction is based on one or more attributes of said one or more of said subscribers.

43. The method of claim 40, wherein said rule reduction is based on a movement of one or more of said subscribers.

* * * * *